(12) United States Patent
Kawakami

(10) Patent No.: US 8,813,618 B2
(45) Date of Patent: Aug. 26, 2014

(54) TUBE CUTTING APPARATUS AND TUBE CUTTING METHOD

(75) Inventor: Teruaki Kawakami, Osaka (JP)

(73) Assignee: Fuji Machine Works Co., Ltd., Osaka (JP)

( * ) Notice: Subject to any disclaimer, the term of this patent is extended or adjusted under 35 U.S.C. 154(b) by 393 days.

(21) Appl. No.: 13/258,216

(22) PCT Filed: Dec. 10, 2009

(86) PCT No.: PCT/JP2009/070646
§ 371 (c)(1),
(2), (4) Date: Sep. 21, 2011

(87) PCT Pub. No.: WO2010/113360
PCT Pub. Date: Oct. 7, 2010

(65) Prior Publication Data
US 2012/0011976 A1    Jan. 19, 2012

(30) Foreign Application Priority Data

Mar. 31, 2009  (JP) ................................. 2009-084061

(51) Int. Cl.
*B23D 21/14*    (2006.01)
(52) U.S. Cl.
CPC ..................................... *B23D 21/14* (2013.01)
USPC ................................................ 83/54; 83/185
(58) Field of Classification Search
USPC ........... 83/54, 185, 192, 193, 194; 82/1.2, 82, 82/88; 30/93, 95, 103, 104
See application file for complete search history.

(56) References Cited

U.S. PATENT DOCUMENTS

2010/0199821 A1*  8/2010  Kawakami ........................ 83/54

FOREIGN PATENT DOCUMENTS

| JP | 02-071916 | 3/1990 |
|---|---|---|
| JP | 02-117817 U | 9/1990 |
| JP | 07-136981 | 5/1995 |
| JP | 2007-301667 | 11/2007 |
| JP | 2008-132578 | 6/2008 |
| JP | 4264908 B | 2/2009 |

OTHER PUBLICATIONS

International Search Report for corresponding International Application No. PCT/JP2009/070646 mailed Mar. 16, 2010.

* cited by examiner

*Primary Examiner* — Stephen Choi
(74) *Attorney, Agent, or Firm* — Renner, Otto, Boisselle & Sklar, LLP

(57) ABSTRACT

The motor (50) transmits its rotation to the main shaft (1) through the first transmission gear train (9) while transmitting rotation at a rotating speed ¾ as high as the rotating speed of the main shaft (1) to the eccentric shaft (2) through the second transmission gear train (10) and the offset shaft coupling (7). As the motor (50) is driven, an eccentric axis (30) moves on a circle decentered by a predetermined length L while the inner blade (3) moves in the same direction on a circle further decentered by the predetermined length L from the eccentric axis (30). The inner blade (3) rotates and moves while exposing part of its outer peripheral surface exteriorly of a tube (W) at plural positions on the outer periphery of the tube (W).

7 Claims, 3 Drawing Sheets

TUBE CUTTING APPARATUS AND TUBE CUTTING METHOD

TECHNICAL FIELD

The present invention relates to tube cutting apparatus and method for cutting a thin-wall tube at a desired cutting position in an axial direction of the tube.

BACKGROUND ART

A thin-wall metal tube having a predetermined length is manufactured by a process including: rounding a thin metal sheet having a larger length than a predetermined length in such a manner that two parallel edges thereof are brought close to each other; welding the two edges together to form a cylindrical tube; and cutting the tube to the predetermined length. One known tube cutting apparatus for use in cutting such a tube is configured to move a cutting tool abutting against the outer peripheral surface of the tube toward the inside of the tube radially of the tube (see Patent Document 1 for example).

In cutting a thin-wall tube having a low strength with such an apparatus configured to move the cutting tool from the outer peripheral surface toward the inside of the tube, however, the thin-wall tube is deformed radially, thus lowering the roundness of the resulting product. In view of this inconvenience, a tube cutting apparatus for use in cutting such a thin-wall tube has heretofore been proposed which is configured to position an outer blade into contact with the outer peripheral surface of the tube and move an inner blade positioned inside the thin-wall tube toward the outside of the tube while rotating the inner blade.

In this case, use of a hollow shaft member and an inclined cam can be conceived for applying the inner blade with a moving force acting radially of the tube while transmitting rotation to the inner blade. The hollow shaft member is adapted to be inserted into the tube coaxially with the tube, supports thereon the inner blade by means of a retainer member at a predetermined axial position for rotation and radial movement, and accommodates therein the inclined cam abutting against the retainer member for axial movement. As the inclined cam moves axially of the hollow shaft member with the hollow shaft member rotating, the position of contact between the retainer member and the inclined cam is displaced radially of the tube to cause the inner blade to move radially of the tube and rotate.

However, in order to move the inclined cam axially within the hollow shaft member while rotating the hollow shaft member on which an inner blade die is rotatably supported so as to be movable radially of the tube, the structure of the hollow shaft member to be inserted into the tube becomes complicated and upsized, resulting in an inconvenience that the apparatus cannot be used to cut thin-wall tubes having relatively small diameters of about 100 mm.

Use of a link mechanism pivotally supported in a plane perpendicular to the axial direction of the tube can be conceived as a component for causing the inner blade to move radially of the tube and rotate. In this case also, a structure for causing the link mechanism to operate becomes complicated and upsized and, hence, the apparatus is not suitable for cutting of thin-wall tubes having relatively small diameters.

In view of such inconveniences, the applicant of the instant application has proposed tube cutting apparatus and method which use a driving mechanism to be located outside the tube for moving the inner blade radially of the tube while rotating the inner blade (see Patent Document 2). The invention described in Patent Document 2 uses a planetary gear mechanism comprising a ring gear and a planetary gear as the driving mechanism for moving the inner blade radially of the tube while rotating the inner blade.

When the planetary gear is caused to revolve along the pitch circle of the ring gear, the planetary gear rotates about its central axis at a higher angular velocity than its revolution because of the difference in the number of teeth between the planetary gear and the ring gear. The planetary gear rotating about its central axis causes a second axis on which the inner blade is rotatably supported to rotate in a manner decentered to a first axis, so that the position of that portion of the outer peripheral surface of the inner blade rotatably supported on the second axis which is most distant from the center of the tube changes gradually.

As the position of that portion of the outer peripheral surface of the inner blade which is most distant from the center of the tube moves further away from the center of the tube, the outer peripheral surface of the inner blade comes into contact with the inner periphery of the tube and then becomes exposed exteriorly of the tube, thereby cutting the tube cooperatively with the outer blade.

When the planetary gear revolves NP times (NP=Z1/Z2 where Z1 represents the number of teeth of the ring gear and Z2 represents the difference in the number of teeth between the ring gear and the planetary gear), the inner blade is returned into its initial position. During the NP times revolutions of the planetary gear, the inner blade becomes partially exposed exteriorly of the tube at N positions along the periphery of the tube, with the result that the tube is cut throughout its entire circumference.

PRIOR ART DOCUMENT

Patent Document

Patent Document 1: Japanese Patent Laid-Open Publication No. HEI7-136981
Patent Document 2: Japanese Granted Patent Publication No. 4264908

SUMMARY OF THE INVENTION

Problems to be Solved by the Invention

The invention described in Patent Document 2 does not need to place a complicated mechanism in the tube and hence is capable of cutting thin-wall tubes having relatively small diameters. However, since the invention described in Patent Document 2 is designed to move the inner blade radially of the tube while rotating the inner blade by the use of the planetary gear mechanism, the difference in pitch circle diameter between the ring gear and the planetary gear has to be set twice as large as the amount of radial movement of the inner blade. Therefore, the difference Z2 in the number of teeth between the ring gear and the planetary gear cannot be made large enough. For this reason, it takes a long time for the inner blade to cut the tube throughout the entire circumference thereof.

In addition, limitations on design make it difficult to set the number of teeth of each of the ring gear and the planetary gear to an integral multiple of the difference Z2 in the number of teeth. For this reason, the planetary gear has to be rotated backwardly in order to return a revolved position of the planetary gear to the initial position quickly. This makes control complicate.

These inconveniences result in a problem that the invention described in Patent document 2 cannot complete a continuous operation of cutting a relatively long-length tube at plural axial positions in a short time.

An object of the present invention is to provide tube cutting apparatus and method which are capable of: cutting a tube throughout the entire circumference thereof in a short time; eliminating the operation of returning the inner blade moving mechanism to its initial position; and realizing shortening of the time required to complete the continuous operation of cutting a continuous-length tube at plural axial positions thereof.

Means for Solving the Problems

In order to solve the foregoing problems, a tube cutting apparatus according to the present invention includes an inner blade, first and second outer blades, a driving source, a main shaft, an eccentric shaft, and rotation transmission means. The inner blade is disc-shaped and is rotatably supported on a rotating axis decentered by a predetermined length from an eccentric axis in a second radial direction which is opposite to a first radial direction of a tube in which the eccentric axis is decentered by the predetermined length from a main axis serving as a central axis of the tube within the tube, the predetermined length being larger than the difference in radius between the tube and the inner blade. The first and second outer blades are shaped annular and have respective inner peripheral surfaces for contact with an entire circumference of an outer periphery of the tube. The first and second outer blades are placed in such a manner that their respective side surfaces which face each other in an axial direction of the tube are positioned substantially coincidentally with opposite side surfaces of the inner blade in the axial direction. The driving source is configured to output rotation. The main shaft has a free end side inserted into the tube and a base end side exposed exteriorly of the tube. The main shaft is supported on the base end side for rotation about the main axis and defines therethrough a bore decentered by the predetermined length from the main axis, the bore having open ends at opposite ends of the main shaft and a circular section. The eccentric shaft is shaped columnar and is rotatably supported in the bore. The eccentric shaft has a first end which is exposed from a free end of the main shaft within the tube and to which the inner blade is fixed in such a manner that a central position of the inner blade coincides with the main axis, and a second end exposed exteriorly of the tube. The rotation transmission means is configured to transmit the rotation of the driving source to the base end side of the main shaft and to the second end of the eccentric shaft at a ratio of M to N (where M and N are natural numbers).

With this construction, the rotation of the driving source is transmitted to the main shaft and to the eccentric shaft decentered by the predetermined length from the main shaft at the ratio of M to N. During N revolutions of the eccentric shaft on a circle decentered by the predetermined length from the main axis which are caused by rotation of the main shaft, the inner blade fixed to the eccentric shaft revolves M times on a circle decentered by the predetermined length from the center of the eccentric shaft. Since the inner blade which is decentered double from the main axis moves while rotating and since the predetermined length is larger than the difference in radius between the tube and the inner blade, the peripheral surface of the inner blade rotates and becomes partially exposed from the inside to the outside of the tube plural times at different circumferential positions on the tube during N revolutions of the eccentric shaft. In this way, the inner blade cuts the tube throughout the entire circumference thereof cooperatively with the outer blades. Any complicated mechanism is not placed within the tube because only the main shaft supporting the eccentric shaft therein for rotation is inserted into the tube.

In the construction described above, the rotation transmission means preferably includes a first transmission section configured to transmit the rotation of the driving source to the main shaft at a first reduction gear ratio, an intermediate shaft supported for rotation about the main axis, a second transmission section configured to transmit the rotation of the driving source to the intermediate shaft at a reduction gear ratio which is M/N as high as the first reduction gear ratio, and an offset shaft coupling for constantly transmitting rotation of the intermediate shaft to the eccentric shaft at the first reduction gear ratio. This feature enables the rotation of the driving source to be easily transmitted to the main shaft and to the eccentric shaft at the ratio of M to N at a place outside the tube, thereby allowing the structure to be simplified.

Preferably, the offset shaft coupling includes a first disc fixed to the intermediate shaft concentrically and a second disc fixed to the eccentric shaft concentrically which is slidable on the first disc only in a diametrical direction passing through the eccentric axis. This feature makes it possible to easily transmit the rotation of the same driving source to the main shaft and to the eccentric shaft moving on the circle decentered from the main shaft.

A tube cutting method according to the present invention comprises three steps. The first step is the step of placing within a tube to be cut a disc-shaped inner blade into a position decentered by a predetermined length from an eccentric axis in a second radial direction which is opposite to a first radial direction of a tube in which the eccentric axis is decentered by the predetermined length from a main axis serving as a central axis of the tube, the predetermined length being larger than the difference in radius between the tube and the inner blade. The second step is the step of placing first and second outer blades in such a manner that their respective inner peripheral surfaces come into contact with an entire circumference of an outer periphery of the tube while their respective side surfaces which face each other in an axial direction of the tube are positioned substantially coincidentally with opposite side surfaces of the inner blade in the axial direction. The third step is the step of rotating the inner blade about a rotating axis M thereof times during N revolutions of the eccentric axis about the main axis, where M and N are different natural numbers.

Advantage(s) of the Invention

The present invention makes it possible to cut a tube throughout the entire circumference thereof in a short time, eliminate the operation of returning the inner blade moving mechanism to its initial position, and realize shortening of the time required to complete a continuous operation of cutting a continuous-length tube at plural axial positions thereof.

BEST MODE FOR CARRYING OUT THE INVENTION

Hereinafter, embodiments of the present invention will be described with reference to the drawings.

Figure 1:
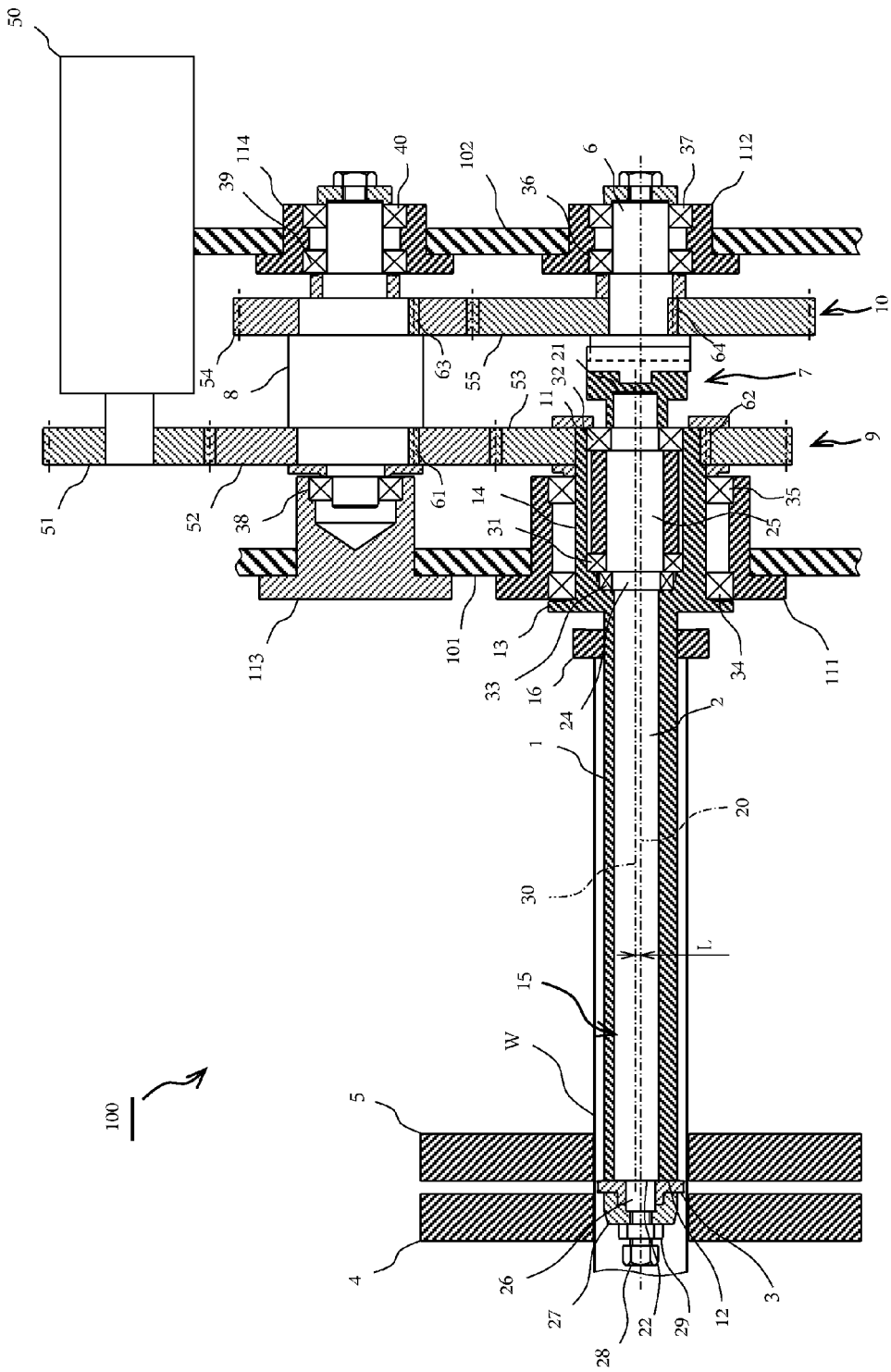
FIG. 1 is a sectional side elevational view illustrating a tube cutting apparatus according to an embodiment of the present invention.

Referring to FIG. 1, a tube cutting apparatus 100 according to an embodiment of the present invention is for use in a manufacturing operation for manufacturing a tube product having a predetermined length from a work W, an example of which is a thin-wall tube made of a metal such as stainless steel. The tube cutting apparatus 100 includes a main shaft 1, an eccentric shaft 2, an inner blade 3, outer blades 4 and 5, an intermediate shaft 6, an offset shaft coupling 7, a drive shaft 8, a first transmission gear train 9, a second transmission gear train 10, and a motor 50.

The main shaft 1 is a tubular member having a smaller diameter than the work W. The work W is to fit over a portion of the main shaft 1 which extends from a free end 12 to an axially intermediate point. The main shaft 1 has a base end 11 formed with a shaft support portion 14 of an enlarged diameter having an intermediate flange portion 13. The shaft support portion 14 of the main shaft 1 is rotatably supported by a bearing portion 111 fitted over the outer periphery thereof. The bearing portion 11 includes bearings 34 and 35 and is fixed to a front side frame 101. The main shaft 1 defines therethrough a bore 15 which is open at the base end 11 and at the free end 12. The central axis of the bore 15 is coincident with an eccentric axis 30 which is decentered by a predetermined length L from a main axis 20 serving as the central axis of the main shaft 1. An outer peripheral surface of the main shaft 1 on the base end 11 side is formed with a stopper 16 extending over the entire circumference thereof. The stopper 16 serves to position the work W fitted over the main shaft 1 from the free end 12 side.

The eccentric shaft 2 is rotatably fitted in the bore 15 of the main shaft 1. The eccentric shaft 2 has a base end 21 formed with a step portion 24 and a large-diameter portion 25 which are increasingly enlarged in diameter in the order described. The eccentric shaft 2 is rotatably supported by the shaft support portion 14 fitted over the outer peripheral surfaces of the step portion 24 and large-diameter portion 25 by means of bearings 31 to 33. The eccentric shaft 2 has a free end 22 formed with a small-diameter shaft portion 26. The shaft portion 26 has a central axis which is decentered by the predetermined length L from the eccentric axis 30 and which is coincident with the main axis 20 when the shaft portion 30 is in its initial position.

The inner blade 3 has a hollow disc shape and is fitted over the shaft portion 26 of the eccentric shaft 2. The inner blade 3 is fixed to the free end 22 of the eccentric shaft 2 by means of a fixing member 27, a fixing screw 28 and a locking nut 29. The outer diameter of the inner blade 3 is made slightly smaller than the inner diameter of the tube W. The predetermined length L is set larger than the difference in radius between the tube W and the inner blade 3.

The outer blades 4 and 5, which are the "first and second outer blades" defined by the present invention, are each shaped annular and have their respective inner peripheral surfaces for contact with the entire circumference of the outer periphery of the tube W. The outer blades 4 and 5 are placed in such a manner that their respective side surfaces which face each other are positioned substantially coincidentally with the opposite side surfaces of the inner blade 3 in a direction along the main axis 20. The outer blades 4 and 5 are a pair of right and left halves for example and are movable between a position in which their inner peripheral surfaces come into contact with the outer periphery of the tube W and a position which fails to overlap the position of the outer periphery of the tube W in the horizontal direction.

The intermediate shaft 6 has a central axis coinciding with the main axis 20 and is rotatably supported by a bearing portion 112 having bearings 36 and 37. The bearing portion 112 is fixed to a rear side frame 102.

Figure 2:
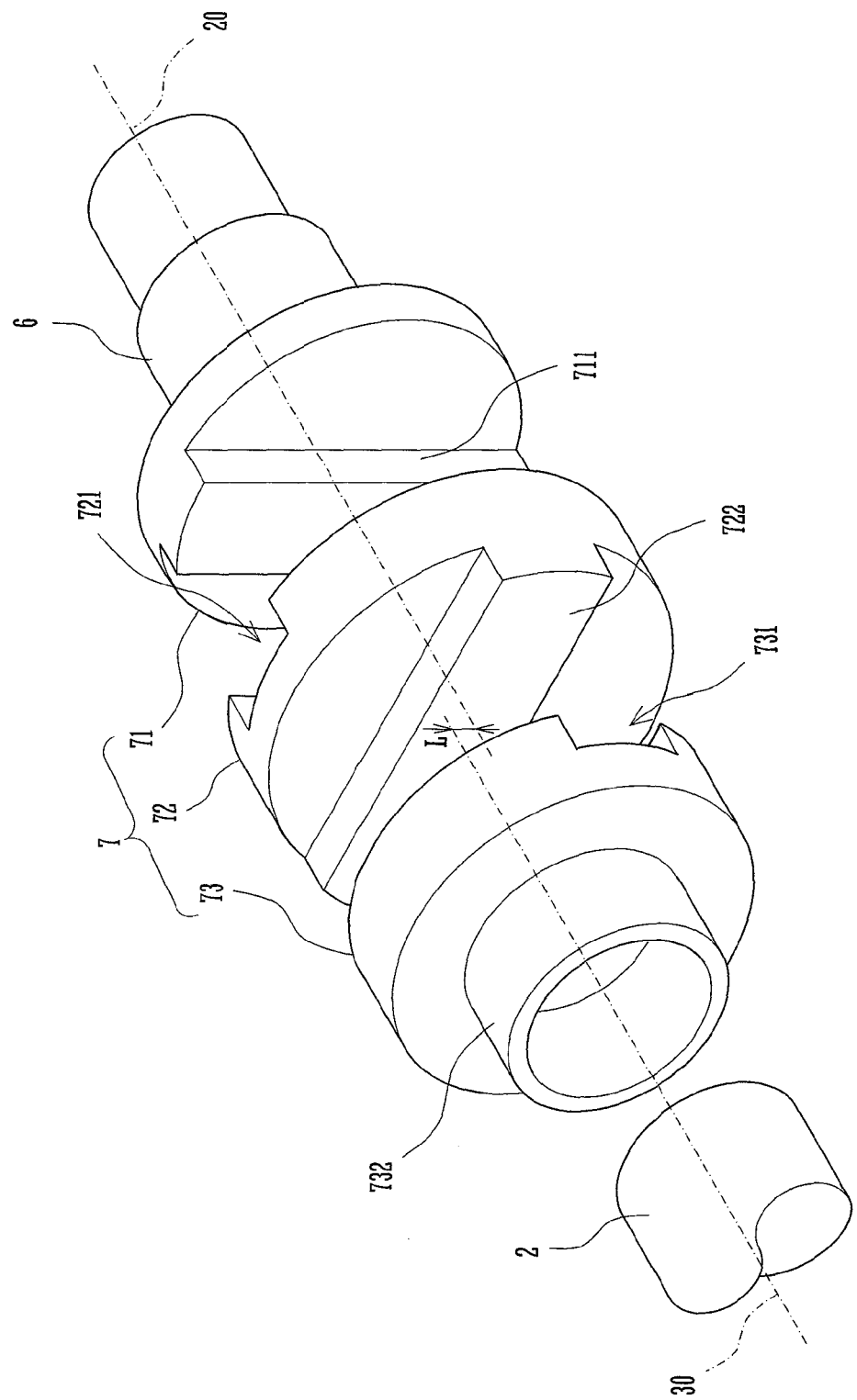
FIG. 2 is a perspective view illustrating an offset shaft coupling used in the tube cutting apparatus.

The offset shaft coupling 7, which is an Oldham coupling for example, comprises a driving side disc 71, an intermediate disc 72, and a driven side disc 73, as shown in FIG. 2. The driving side disc 71 is fixed to one end face of the intermediate shaft 6 concentrically. The driven side disc 73 is fixed to a base end portion of the eccentric shaft 2 concentrically by means of a non-illustrated key, the base end portion being fitted in a boss portion 732. The intermediate disc 72 intervenes between the driving side disc 71 and the driven side disc 73.

The driving side disc 71 has a side facing the intermediate disc 72 which is formed with a ridge 711 having a centerline crossing the eccentric axis 30. The intermediate disc 72 has a side facing the driving side disc 71 which is formed with a slot 721 receiving the ridge 711 therein for sliding in the longitudinal direction. The intermediate disc 72 has an opposite side facing the driven side disc 73 which is formed with a ridge 722. The slot 721 and ridge 722 of the intermediate disc 72 are perpendicular to each other in a plane to which the main axis 20 and the eccentric axis 30 are normal. The driven side disc 73 has a side facing the intermediate disc 72 which is formed with a slot 731 receiving the ridge 722 therein for sliding in the longitudinal direction.

Rotation of the driving side disc 71 is transmitted to the intermediate disc 72 by engagement between the ridge 711 and the slot 721. Rotation of the intermediate disc 72 is transmitted to the driven side disc 73 by engagement between the ridge 722 and the slot 731. The driven side disc 73 rotates at the same rpm as the driving side disc 71.

The offset shaft coupling 7 is not limited to a coupling configured to transmit rotation by engagement between the ridges 711 and 722 and the slots 721 and 731, but may be a coupling which utilizes engagement between a circular hole and a pin or which is provided with a link mechanism as long as the coupling can transmit rotation between two shafts decentered from each other.

The drive shaft 8 is rotatably supported at its opposite ends by bearing portions 113 and 114. The bearing portion 113 includes a bearing 38 and is fixed to the frame 101. The bearing portion 114 includes bearings 39 and 40 and is fixed to the frame 102.

The first transmission gear train 9, which is equivalent to the "first transmission section" defined by the present invention, comprises gears 51 to 53 and is located on the frame 101 side between the frames 101 and 102. The gear 51 is fixed to the output shaft of the motor 50 forming the "driving source" defined by the present invention and meshes with the gear 52. The gear 52 is fixed to an end of the drive shaft 8 which is located on the frame 101 side by means of a key 61 and meshes with the gears 51 and 53. The gear 53 is fixed to a base end portion of the main shaft 1 by means of a key 62 and meshes with the gear 52. In an exemplary arrangement, the number of teeth of each of the gears 52 and 53 is set to 70. The first transmission gear train 9 transmits the rotation of the output shaft of the motor 50 to the main shaft 1 through the gears 51 to 53.

The second transmission gear train 10, which is equivalent to the "second transmission section" defined by the present invention, comprises gears 54 and 55 and is located on the frame 102 side between the frames 101 and 102. The gear 54 is fixed to an end of the drive shaft 6 located on the frame 102 side by means of a key 63 and meshes with the gear 55. The gear 55 is fixed to the intermediate shaft 8 by means of a key 64. In an exemplary arrangement, the number of teeth of the gear 54 is set to 60, while that of the gear 55 set to 80. The second transmission gear train 10 transmits the rotation of the output shaft of the motor 50 to the intermediate shaft 8 through the drive shaft 8 and the gears 54 and 55.

Since the number of teeth of the gear 52 is equal to that of the gear 53, the main shaft 6 rotates at the same rotating speed as the drive shaft 8. Since the number of teeth of the gear 54 is ¾ as large as that of the gear 55, the rotating speed of the intermediate shaft 6 is ¾ as high as that of the drive shaft 8. Therefore, the second transmission gear train 10 comprising the gears 54 and 55 transmits the rotation of the motor 50 to the intermediate shaft 6 at a reduction gear ratio which is ¾ as high as the reduction gear ratio of the first transmission gear 9.

The rotation of the intermediate shaft 6 is transmitted to the eccentric shaft 2 through the offset shaft coupling 7. The offset shaft coupling 7 transmits the rotation of the intermediate shaft 6 to the eccentric shaft 2 without changing the rpm of the intermediate shaft 6. The rotation of the main shaft 1 causes the eccentric shaft 2 to move on a circle which is centered on the main axis 20 and which has a radius equal to the predetermined length L. As the eccentric shaft 2 moves, the offset shaft coupling 7 transmits rotation at a rotating speed which is ¾ as high as the rotating speed of the main shaft 1 to the eccentric shaft 2. Accordingly, the eccentric shaft 2 moves on the circle centered on the main axis 20 and having the radius equal to the predetermined length L while rotating at the speed which is ¾ as high as the rotating speed of the main shaft 1.

In the offset shaft coupling 7, the ridge 711 of the driving side disc 71 slides in the slot 721 of the intermediate disc 72 in a first diametrical direction, while the ridge 722 of the intermediate disc 72 slides in the slot 731 of the driven side disc 73 in a second diametrical direction perpendicular to the first diametrical direction. Thus, the offset shaft coupling 7 can constantly transmit the rotation of the intermediate shaft 6 to the eccentric shaft 2 by transmitting the rotation of the driving side disc 71 about the main axis 20 to the driven side disc 73 moving on the circle centered on the main axis 20 and having the radius equal to the predetermined length L.

The inner blade 3, which is fixed to the shaft portion 26 projecting from the free end 12 of the eccentric shaft 2, moves on a circle centered on the eccentric axis 30 and having the radius equal to the predetermined length L as the eccentric shaft 2 revolves. Therefore, the inner blade 30 moves on the circle decentered by the predetermined length L again from the eccentric axis 30 which moves on the circle decentered by the predetermined length L from the main axis 20 coinciding with the central axis of the tube W.

Figure 3A:
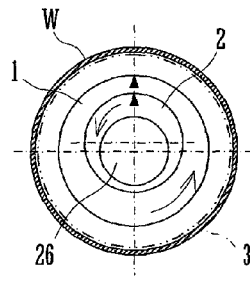
FIGS. 3A-3P are a view illustrating movements of a main shaft, eccentric shaft and inner blade in the tube cutting apparatus.
Figure 3B:
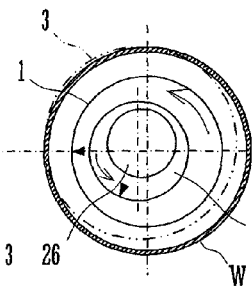

In the tube cutting apparatus 100, the initial position of the center of the shaft portion 26 and that of the center of the inner blade 3 are on the main axis 20, as shown in FIG. 3A.

A tube cutting method according to the present invention includes the steps of:

placing within a tube to be cut a disc-shaped inner blade into a position decentered by a predetermined length from an eccentric axis in a second radial direction which is opposite to a first radial direction of the tube in which the eccentric axis is decentered by the predetermined length from a main axis serving as a central axis of the tube, the predetermined length being larger than the difference in radius between the tube and the inner blade;

placing first and second outer blades in such a manner that their respective inner peripheral surfaces come into contact with an entire circumference of an outer periphery of the tube while their respective side surfaces which face each other in an axial direction of the tube are positioned substantially coincidentally with opposite side surfaces of the inner blade in the axial direction; and rotating the inner blade about the rotating axis M times during N revolutions of the eccentric axis about the main axis, where M and N are different natural numbers.

In cutting the tube W with the tube cutting apparatus 100 by the tube cutting method according to the present invention, the inner blade 3 is placed in its initial position in which the central position of the inner blade 3 is coincident with the main axis 20. With the inner blade 3 in this position, the outer blades 4 and 5 are separated from each other and moved sidewardly to separate their respective inner peripheral surfaces from the outer periphery of the main shaft 1 and then the tube W is moved to fit over the main shaft 1 until its one end comes into contact with the stopper 16.

In this way, the inner blade 3 is placed within the tube W to assume the position decentered by the predetermined length L from the eccentric axis 30 in the second radial direction which is opposite to the first radial direction of the tube W in which the eccentric axis 30 is decentered by the predetermined length L from the main axis 20, the predetermined length L being larger than the difference in radius between the tube W and the inner blade 3.

Subsequently, the outer blades 4 and 5 are unified in such a manner that their respective inner peripheral surfaces come into contact with the outer periphery of the tube W. Thus, the outer blades 4 and 5 are placed in such a manner that their respective inner peripheral surfaces come into contact with the entire circumference of the outer periphery of the tube W while their respective side surfaces which face each other in the axial direction of the tube W are positioned substantially coincidentally with the opposite side surfaces of the inner blade 3 in the axial direction.

With the tube W being held by the outer blades 4 and 5, the motor 50 is driven. Rotation of the output shaft of the motor 50 is transmitted to the main shaft 1 and to the eccentric shaft 2 through the first gear train 9, second gear train 10 and offset shaft coupling 7. By driving the motor 50 so that the eccentric axis 30 revolves about the main axis 20 four times, the inner blade 3 is caused to revolve about the eccentric axis 30 three times.

Figure 3C:
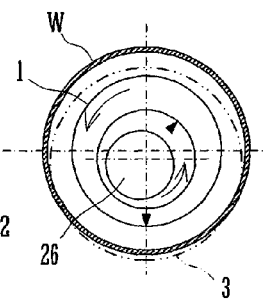
Figure 3D:
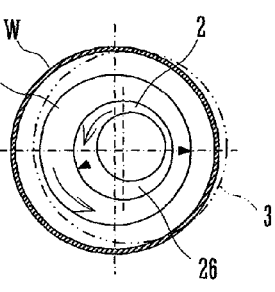
Figure 3E:
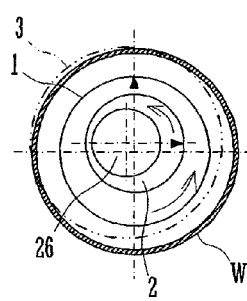
Figure 3F:
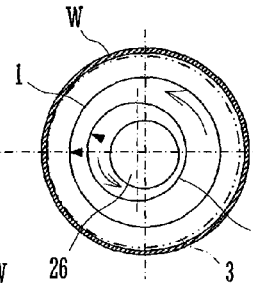
Figure 3G:
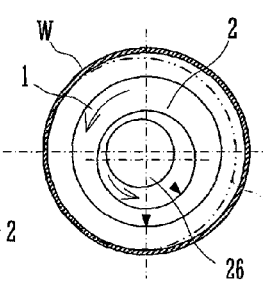
Figure 3H:
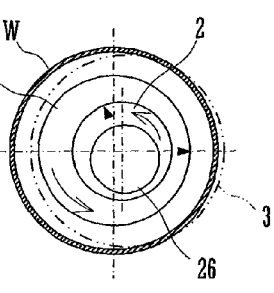
Figure 3I:
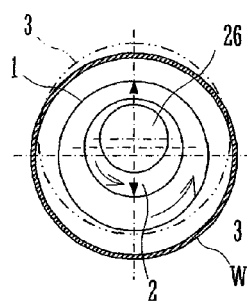
Figure 3J:
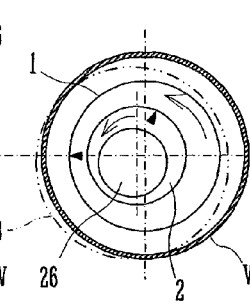
Figure 3K:
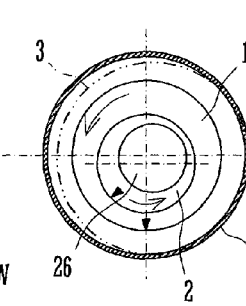
Figure 3L:
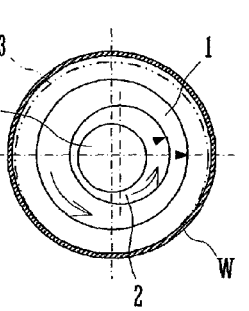
Figure 3M:
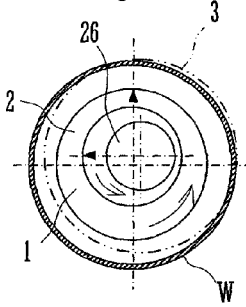

When the motor 50 is driven from the position illustrated in FIG. 3A, the eccentric axis 30 moves on a circle decentered by the predetermined length L at a first speed, while the inner blade 3 moves on a circle further decentered by the predetermined length L from the eccentric axis 30 at a second speed in the same direction. The second speed is ¾ as high as the first speed. Therefore, as the main shaft 1 rotates once, twice and three times, the eccentric shaft 3 rotates ¾ times, ½ times and 9/4 times as illustrated in FIGS. 3(E), 3(I) and 3(M).

In this way, the inner blade 3 gradually changes its peripheral position relative to the tube W while rotating. That is, the inner blade 3 moves in such a manner that its outer peripheral surface becomes partially exposed exteriorly of the tube W at plural positions on the outer periphery of the tube W. In causing the outer peripheral surface of the inner blade 3 to become partially exposed exteriorly of the tube W, the peripheral wall of the tube W is pinched between the opposite side surfaces of the inner blade 3 and the facing side surfaces of the outer blades 4 and 5, so that the tube W is cut.

Figure 3N:
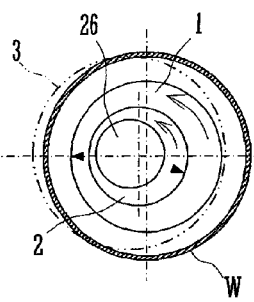
Figure 3O:
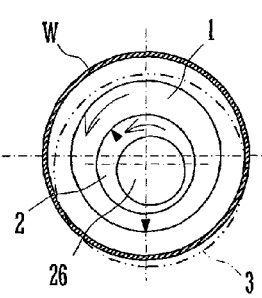
Figure 3P:
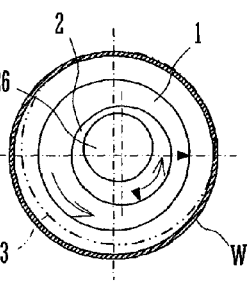

The eccentric shaft 2 rotates 3/16 times per ¼ rotation of the main shaft 1. In the position illustrated in FIG. 3P, the main shaft 1 has rotated 3+¾ times from the initial position illustrated in FIG. 3A, whereas the eccentric shaft 2 has rotated 2+13/16 times from the initial position illustrated in FIG. 3A. As the main shaft 1 further rotates ¼ times from the position illustrated in FIG. 3P, i.e., 4 times from the initial position, the eccentric shaft 2 rotates 3 times from the initial position and hence returns into the initial position illustrated in FIG. 3A.

As the main shaft 1 rotates 4 times, the eccentric shaft 2 rotates 3 times. During the three rotations of the eccentric shaft 2, the outer peripheral surface of the inner blade 3 is exposed exteriorly of the tube W to protrude most exteriorly of the tube W at three positions, specifically, at a position between the positions illustrated in FIGS. 3C and 3D, at the position illustrated in FIG. 3E, and at a position between the positions illustrated in FIGS. 3N and 3O. Thus, the tube W is completely cut throughout the entire circumference thereof, while the main shaft 1 and the eccentric shaft 2 return into their initial positions.

By shifting the position of the stopper 16 toward the free end 11 along the main axis 20 after having cut the tube W at one position, the tube W can be cut at plural axial positions thereof without the need to perform the operation for returning the apparatus into the initial condition. By repeating the operation described above, plural short tubes having short axial lengths can be easily manufactured from the single tube W in a short time.

Only the main shaft 1 through which the eccentric shaft 2 extends and the inner blade 3 fixed to the eccentric shaft 2 are present within the tube W. Thus, there is no need to place a complicate mechanism within the tube W and, therefore, it is possible to cut a tube W having a small inner diameter.

By making the outer diameter of the main shaft 1 smaller than the inner diameter of the thinnest one of tubes W to be cut, the tubes W having different diameters can be cut if the inner blade 3 and the outer blades 4 and 5 are replaced with appropriate ones. The rotating speed ratio between the main shaft 1 and the eccentric shaft 2 is not limited to the ratio of 3 to 4. It is sufficient that as the main shaft 1 rotates a natural number of times, the eccentric shaft 2 rotates a different natural number of times.

It should be noted that any one of the foregoing embodiments is illustrative and not limitative of the present invention and, therefore, various changes and modifications are possible within the scope of the present invention.

DESCRIPTION OF REFERENCE CHARACTERS

1 . . . main shaft
2 . . . eccentric shaft
3 . . . inner blade
4,5 . . . outer blade
6 . . . intermediate shaft
7 . . . offset shaft coupling
8 . . . drive shaft
9 . . . first transmission gear train (first transmission section)
10 . . . second transmission gear train (second transmission section)
11 . . . base end
12 . . . free end
50 . . . motor (driving source)
100 . . . tube cutting apparatus
W . . . work (tube)

The invention claimed is:

1. A tube cutting apparatus comprising:
a disc-shaped inner blade rotatably supported on a rotating axis decentered by a predetermined length from an eccentric axis in a second direction which is opposite to a first direction of a tube in which the eccentric axis is decentered by the predetermined length from a main axis serving as a central axis of the tube within the tube;
first and second annular outer blades having respective inner peripheral surfaces for contact with an entire circumference of an outer periphery of the tube and placed in such a manner that their respective side surfaces which face each other in an axial direction of the tube are positioned substantially coincidentally with opposite side surfaces of the inner blade in the axial direction;
a driving source configured to output rotation;
a main shaft having a free end side inserted into the tube and a base end side exposed exteriorly of the tube, the main shaft being supported on the base end side for rotation about the main axis and defining therethrough a bore having a circular section, a central axis of the bore decentered by the predetermined length from the main axis, and the main shaft having open ends at opposite ends;
a columnar eccentric shaft rotatably supported in the bore and having a first end exposed from a free end of the main shaft within the tube and to which the inner blade is fixed in such a manner that a central position of the inner blade coincides with the main axis, and a second end exposed exteriorly of the tube; and
rotation transmission means configured to transmit the rotation of the driving source to the base end side of the main shaft and to the second end of the eccentric shaft at a ratio of M to N (where M and N are positive integers).

2. The tube cutting apparatus according to claim 1, wherein the rotation transmission means includes:
a first transmission section configured to transmit the rotation of the driving source to the main shaft at a first reduction gear ratio;
an intermediate shaft supported for rotation about the main axis;
a second transmission section configured to transmit the rotation of the driving source to the intermediate shaft at a reduction gear ratio which is M/N as high as the first reduction gear ratio; and
an offset shaft coupling for constantly transmitting rotation of the intermediate shaft to the eccentric shaft.

3. The tube cutting apparatus according to claim 2, wherein the offset shaft coupling includes a driving side disc fixed to the intermediate shaft concentrically, a driven side disc fixed to the eccentric shaft concentrically, and an intermediate disc which is slidable on the driving side disc only in a first diametrical direction of the driving side disc while being slidable on the driven side disc only in a second diametrical direction perpendicular to the first diametrical direction.

4. The tube cutting apparatus according to claim 1, wherein N is four and M is five.

5. The tube cutting apparatus according to claim 2, wherein N is four and M is five.

6. The tube cutting apparatus according to claim 3, wherein N is four and M is five.

7. A tube cutting method comprising the steps of:
placing within a tube to be cut a disc-shaped inner blade into a position decentered by a predetermined length from an eccentric axis in a second radial direction which is opposite to a first radial direction of a tube in which the eccentric axis is decentered by the predetermined length from a main axis serving as a central axis of the tube;
placing first and second outer blades in such a manner that their respective inner peripheral surfaces come into contact with an entire circumference of an outer periphery of the tube while their respective side surfaces which face each other in an axial direction of the tube are positioned substantially coincidentally with opposite side surfaces of the inner blade in the axial direction; and rotating the inner blade about the eccentric axis M times during N revolutions of the eccentric axis about the main axis, where M and N are different positive integers.

* * * * *